UNITED STATES PATENT OFFICE.

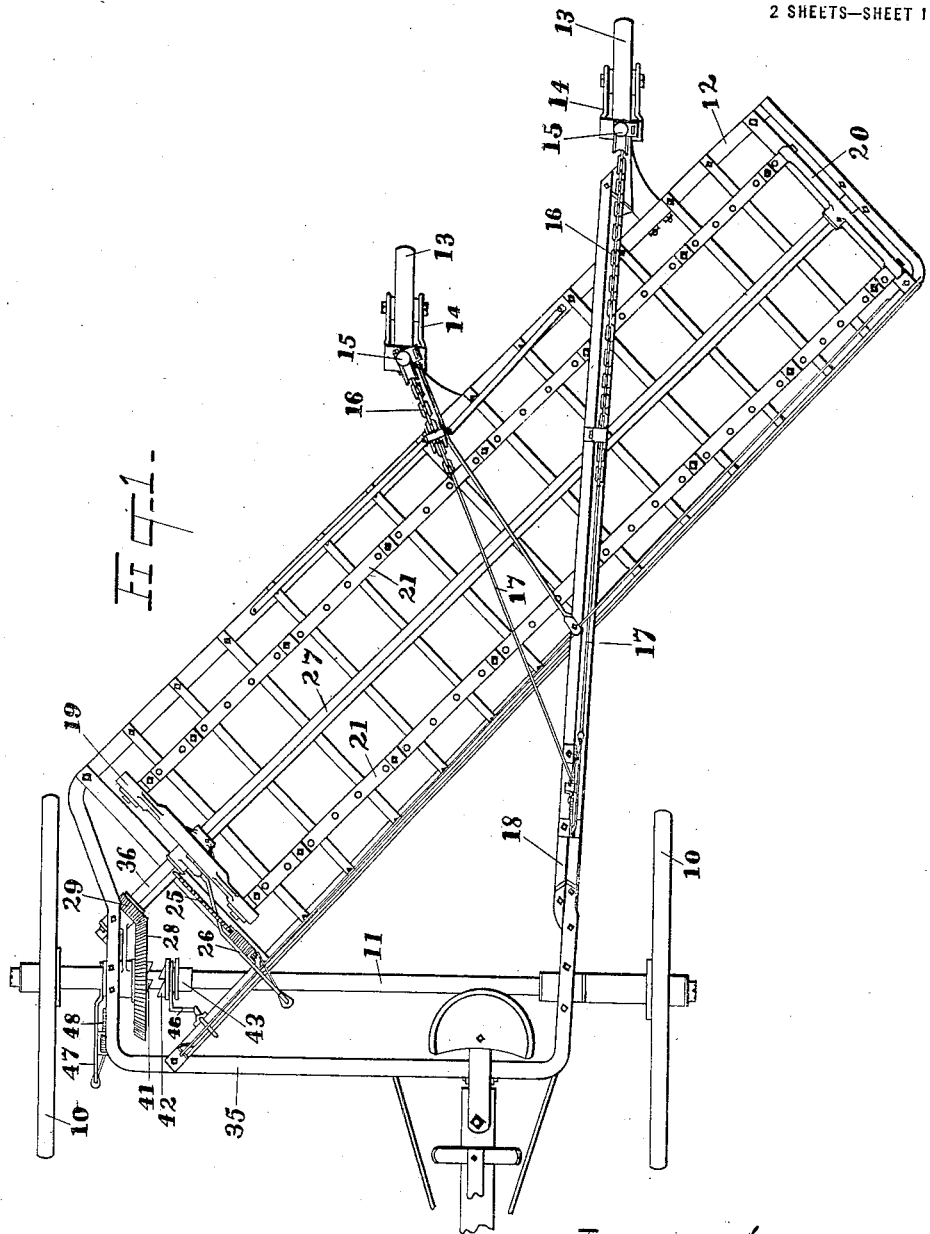

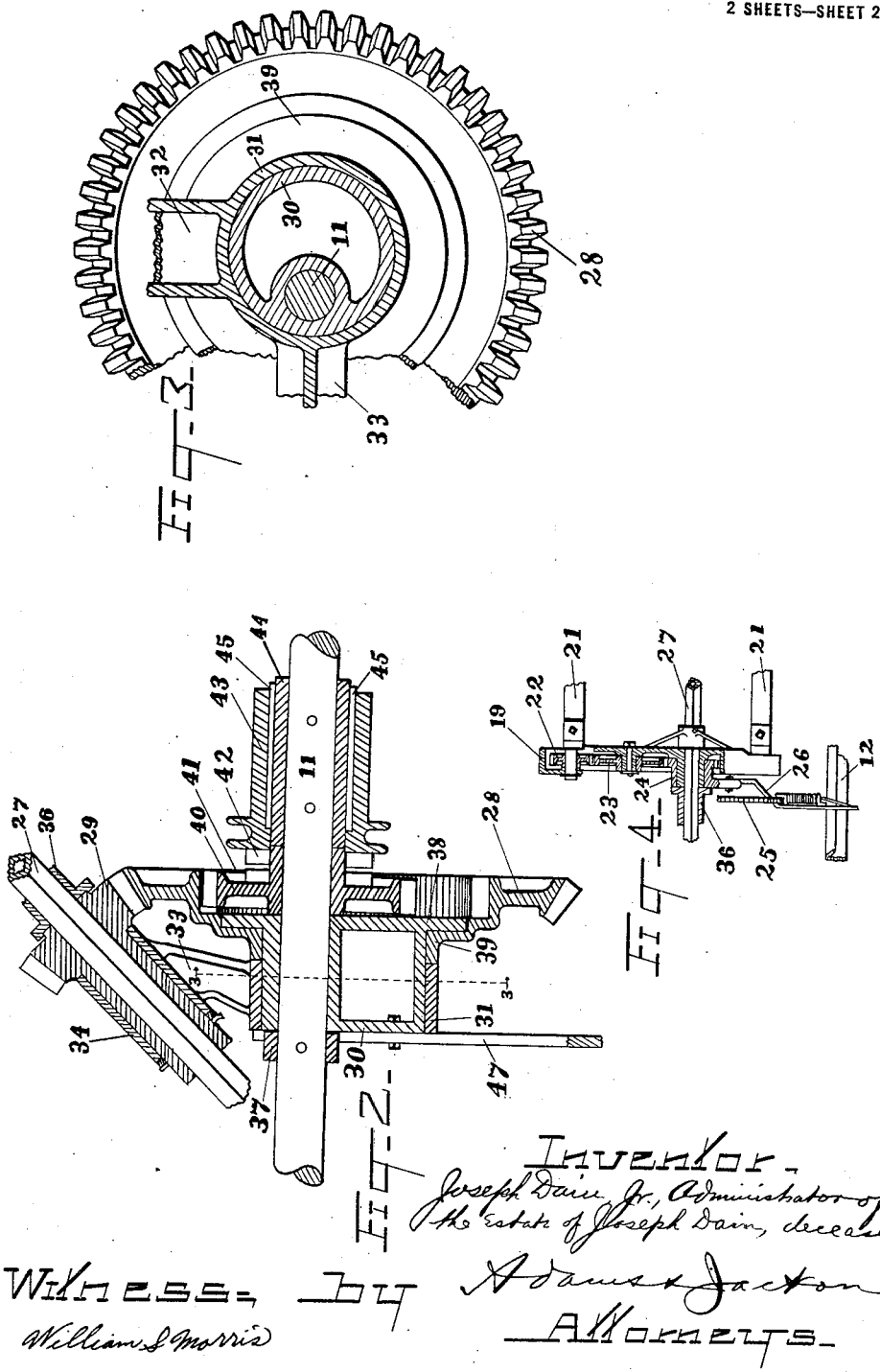

JOSEPH DAIN, DECEASED, LATE OF MOLINE, ILLINOIS, BY JOSEPH DAIN, JR., ADMINISTRATOR, OF MOLINE, ILLINOIS, ASSIGNOR TO THE DAIN MANUFACTURING COMPANY OF IOWA, OF OTTUMWA, IOWA, A CORPORATION OF IOWA.

SIDE-DELIVERY ROTARY RAKE.

1,371,411.   Specification of Letters Patent.   Patented Mar. 15, 1921.

Application filed July 10, 1919. Serial No. 309,836.

*To all whom it may concern:*

Be it known that I, JOSEPH DAIN, Jr., a citizen of the United States, residing at Moline, in the county of Rock Island and State of Illinois, administrator of the estate of JOSEPH DAIN, deceased, late of said Moline, Illinois, hereby declare that the said JOSEPH DAIN did invent certain new and useful Improvements in Side-Delivery Rotary Rakes, of which the following is a specification, reference being had to the accompanying drawings.

This invention relates to side-delivery rotary rakes of the type employing a rotary reel arranged at an angle to the line of draft, such reel carrying several series of rake-teeth which are all maintained at the same angle so as to be properly presented to the hay that is to be raked into windrows. Such teeth are held in the desired uniform working position by the employment of suitable mechanism carried by the forward reel-head, such mechanism ordinarily comprising a set of gears in connection with each tooth-bar and a single other gear that is in mesh with one of the gears of each of the said sets of gears.

While rakes such as referred to are provided with means at the rear side and adjacent to the outer end of the reel-frame for supporting such frame, and with relation to which such frame can be vertically adjusted by causing it to rock about the main axle of the machine as an axis, it is sometimes of advantage to further and independently adjust such frame vertically at its forward end, and it is the object of this invention to provide improved means for accomplishing this last-named adjustment, which object is attained by the devices and combinations of devices shown in the accompanying drawings and hereinafter particularly described. That which is believed to be new will be set forth in the claims.

In the drawings,—

Figure 1 is a plan view of a side-delivery rotary hay-rake in which the invention is embodied;

Fig. 2 is a detail, being a horizontal central section through the intermeshing driving gear and pinion on the axle of the machine and the shaft of the rotatable reel, respectively, and showing also a portion of the means by which the vertical adjustment of the forward or inner end of the reel-frame is accomplished;

Fig. 3 is a cross-section taken at line 3—3 of Fig. 2; and

Fig. 4 is a detail, mostly in horizontal section, showing the inner or forward reel-head, a portion of the gearing carried thereby for maintaining the tooth-bars in proper position, and the lever and its pivoted sector that are employed when the gearing is to be adjusted to cause a change in the angle of the rake-teeth.

Referring to the several figures of the drawings, 10—10 indicate a pair of carrying wheels mounted upon an axle 11. The wheels will be connected with the axle by any suitable means that will cause a rotation of the axle upon the forward movement of the machine, but which will not cause the axle to rotate when the machine is backed. Such connecting means between an axle and a pair of wheels are common and well understood and hence are not illustrated. 12 indicates an ordinary diagonally-disposed reel-frame that at its forward portion is so connected with the axle that it will rock about such axle as an axis when the frame is adjusted vertically by a relative movement between it and the usual rear ground engaging supporting means. It is common to provide one or more ground-engaging devices in the rear of the reel-frame and connected with such frame in such manner as to permit the frame to be adjustable vertically with relation thereto. In the construction shown two such devices are shown comprising caster wheels 13 each secured between a yoke 14 from which rises a vertical standard 15 pivotally connected with the frame, and from each of which extends a connection consisting partly of a chain member 16 and a link member 17, the two connections being attached to an adjusting lever mounted on the usual long truss member 18 that extends from the wheeled support back and over the reel-frame. By a stroke of the lever an adjustment of the frame up or down relative to the ground-engaging supports 13 will be had. These adjusting devices are not illustrated in detail because, by themselves they form no part of my invention, and, indeed, may be of any well-known construction. The details, however, of the particular two-wheel supporting means are clearly shown and described in the Letters Patent of the United States No. 1,313,880, dated August 26, 1919, granted upon the application of one Leon R. Clausen.

The reel that is rotatably mounted in the frame 12 comprises two heads the inner or forward one of which is indicated by 19 and the outer or rear one by 20, such heads being connected together by a plurality of bars 21—three as shown—to which bars are secured in the usual manner the raking teeth. The inner or forward head 19 has rotatably secured to its outer face a plurality of sets of gears, the number of sets corresponding in number to the number of the tooth bars 21, and in the outer gear of each set the forward end of one of the tooth bars will be secured as usual. In Fig. 4 is shown in section one of the sets of gears referred to, the outer one of the gears being indicated by 22 and the gear that is in mesh therewith and which is journaled upon a pin made fast to the head being indicated by 23. The member 23 of each of the sets of gears referred to is in mesh with a smaller central gear 24 which is normally held fixed against rotation, but which by reason of being mounted on a cylindrical hub member, as shown, may be rocked in order to effect a change in the position of the several toothbars so as to incline the teeth carried thereby to the extent desired. There is shown in said Fig. 4 a lever and movable sector construction for accomplishing this rocking of the central gear, which lever and sector construction is shown and described in detail in the Letters Patent granted to Leon R. Clausen, No. 1,283,674, dated November 5, 1918. The pivoted sector referred to is here indicated by 25 and the lever that interlocks therewith and is connected at its inner end with the gear 24 is indicated by 26.

27 indicates the usual central shaft of the reel upon which the reel-heads 19 and 20 are suitably secured so as to turn therewith, said shaft being preferably angular in cross-section, but suitably shaped at its ends to adapt such ends to be journaled in place in bearings carried by opposite end portions of the frame. The shaft is driven in the usual manner by the intermeshing of a bevel gear 28 on the axle 11 and a bevel gear 29 on the reel shaft, but whereas the said gear has heretofore been of ordinary construction, the gear 28 that is here employed is of a special construction as is necessary in the carrying out of this invention, as will be made to appear hereinafter. 30 indicates a sleeve mounted loosely and eccentrically on the axle 11 and forming the bearing for one end portion of such axle. Around the eccentric sleeve 30 is a ring 31 from which extends upwardly an arm 32 (see Fig. 3) that is bolted to the overlying member of a portion of the main frame, and also formed with such ring and projecting rearwardly therefrom is another arm 33 that terminates in a sleeve 34 that surrounds and affords a bearing for the extended hub of the pinion 29 on the shaft 27, said hub sleeve member being held in place, as shown in Fig. 2, by a cotter pin, or in any other suitable manner. The portion of the frame to which the upright arm 32 is bolted is in the nature of an extension of the main frame 12 and is indicated by 35, and, as shown, is the part that overlies and is connected with the axle 11. 36 indicates a sleeve over that portion of the reel-shaft 27 between the pinion 29 and the inner reel-head and is simply intended as a spacing device that would prevent any movement inward of the pinion 29. 37 indicates a collar secured to the axle 11 to hold the eccentric sleeve 30 in proper position on the axle.

The inner end of the eccentric sleeve has an annular flange 38 at its inner end and resting upon such flange and upon the outer surface of the eccentric sleeve so as to be rotatable thereon is a flange 39 formed with the said bevel gear 28. The inner face of the gear 28 is provided with a deep annular recess, as clearly shown in Fig. 2, the annular wall of which is toothed as shown to form an internal gear with which meshes the teeth of a spur gear 40 located in said recess and rotatably mounted upon the shaft 11. Upon one face of the spur gear 40 are provided a plurality of clutch teeth 41 adapted to interlock with the teeth 42 of a clutch member 43 that is movable along the axle 11. The clutch member 43 is mounted upon a sleeve 44 that is made fast to the axle 11, the clutch member 43 being movably secured on such sleeve by means of one or more feathers or keys 45. The clutch member 43 will be moved into and out of clutching engagement with the spur gear 40 by means of a shifting lever 46 (see Fig. 1). 47 indicates a lever rigidly affixed to the outer end of the eccentric sleeve 30 by means of which the said sleeve can be rocked, the lever having the usual spring latch for engaging a segmental rack 48 carried by the frame member 35 whereby the eccentric sleeve may be locked in any position to which it may be adjusted.

In operation, to cause a rotation of the reel the clutch member 43 will be moved into clutching engagement with the spur gear 40 and as such spur gear is in mesh with the internal gear of the bevel gear 28 such bevel gear will be, of course, driven and through its meshing engagement with the pinion 29 will rotate the reel as usual, the bevel gear 28 turning freely, of course, on the hub and flange of the eccentric sleeve 30.

Now if it be desired to give the inner or forward end of the reel a vertical adjustment in addition to the adjustment that is given to the frame through the lever that controls the ground-engaging devices 13 such additional adjustment may be had by releasing the latch of the lever 47 from its segment 48 and giving such lever 47 a stroke in the proper direction to cause either a raising or lowering of the frame. The turning of such lever 47 will, of course, rock the eccentric sleeve 30 on the axle, and, according to the direction of movement of the lever, so shift the eccentric and the ring surrounding it as to elevate or lower the frame, inasmuch as such frame is connected with the eccentric ring through the medium of the vertical arm 32 and the rearwardly-extending arm 33. Such adjustment through the medium of the eccentric sleeve cannot, of course, affect the relation of the spur gear to the internal gear with which it meshes, and hence, of course, such gear members are always in driving relation. Also, it will be noted that inasmuch as the gear shifting lever 26 and its pivoted segment are carried by the frame their relations to each other or to the central gear 24 with which the lever connects are not disturbed.

What is claimed as the invention and is desired to be secured by Letters Patent, is—

1. In a rotary rake, the combination of a wheeled support comprising a rotatable axle, a rearwardly-extending and diagonally-arranged reel-frame adjustably connected with said support, a rotatable reel supported in said frame, means for rotating the reel from the rotatable axle of said support, said means comprising two gears supported from said axle, means for adjusting the said reel-frame relative to said support and simultaneously shifting the axis of one of said two gears relative to the axis of the other of said gears, and means for causing a clutching engagement of one of said gears with said axle.

2. In a rotary-rake, the combination of a wheeled support comprising a rotatable axle, a rearwardly-extending and diagonally-arranged reel-frame adjustably connected with said support, a rotatable reel supported in said frame, means for rotating the reel from the rotatable axle of said support, said means comprising an internal gear and a spur gear in constant mesh with each other and both supported from said axle, means for adjusting the said reel-frame relative to said support and simultaneously shifting the axis of said internal gear relative to the axis of said spur gear, and means for causing a clutching engagement of one of said gears with said axle.

3. In a rotary-rake, the combination of a wheeled support comprising a rotatable axle, a rearwardly-extending and diagonally-arranged reel-frame adjustably connected with said support, a rotatable reel supported in said frame, means for rotating the reel from the rotatable axle of said support, said means comprising an internal gear and a spur gear in constant mesh with each other and both supported from said axle, means for adjusting the said reel-frame relative to said support and simultaneously shifting the axis of said internal gear relative to the axis of said spur gear, said adjusting means comprising a member loosely and eccentrically mounted on said axle and movably connected with said internal gear, and means for causing a clutching engagement of said other gear with said axle.

4. In a rotary rake, the combination of a wheeled support comprising a rotatable axle, a diagonally-extending frame having its forward portion pivotally connected with said wheeled support, a reel in said frame and comprising a rotatable shaft, an eccentric sleeved on said axle, a ring on said eccentric having an upright arm on which a member of the reel-frame bears and a rearwardly-extending arm into which the reel-shaft extends, means for rocking said eccentric to cause an adjustment of the frame, and means for rotating the reel from the rotation of the axle regardless of the position of the eccentric.

5. In a rotary rake, the combination of a wheeled support comprising a rotatable axle, a diagonally-extending frame having its forward portion pivotally connected with said wheeled support, a reel in said frame and comprising a rotatable shaft, an eccentric sleeved on said axle, a ring on said eccentric having two arms one of which extends upward and is connected to a member of said frame and the other extending rearwardly and having at its rear end a sleeve, a pinion fast on the reel-shaft and having an extended hub portion journaled in said sleeve, means for rocking said eccentric to cause an adjustment of the frame, and a gear on the said axle for engagement with said pinion for rotating the reel regardless of the position of the eccentric.

6. In a rotary rake, the combination of a diagonally-arranged frame, a wheeled support comprising a rotatable axle with which the forward end of said frame is pivotally connected, an eccentric sleeved on said axle, a ring on said eccentric having two arms connected with different points of the frame, means for rocking said eccentric to cause an adjustment of the frame, means for locking the eccentric in different adjusted positions, and means for rotating the reel from the rotation of the axle regardless of the position of the eccentric.

7. In a rotary rake, the combination of a wheeled support comprising a rotatable axle, a frame diagonally-disposed in the rear of said axle, a rotatable reel supported in said frame, an eccentric sleeve loosely mounted on said axle, means for supporting the frame from said sleeve, means for rocking said sleeve on the axle to raise and lower the frame, a gear rotatably mounted on said sleeve, a pinion secured to the reel and in mesh with said gear, and a clutch device on said axle for connecting said axle and gear together.

8. In a rotary rake, the combination of a wheeled support comprising a rotatable axle, a frame diagonally-disposed in the rear of said axle, a rotatable reel supported in said frame, an eccentric sleeve loosely mounted on said axle, means for supporting the frame from said sleeve, means for rocking said sleeve on the axle to raise and lower the frame, a gear rotatably mounted on said sleeve, said gear being provided with external and internal gear teeth, a pinion secured to the reel and in mesh with the external teeth of the gear, a second gear loose on the axle and in constant mesh with the internal teeth of said first-mentioned gear, and means for locking said second-mentioned gear to the axle.

9. In a rotary rake, the combination of a wheeled support comprising a rotatable axle, a frame diagonally-disposed in the rear of said axle, a rotatable reel supported in said frame, an eccentric sleeve loosely mounted on said axle, means for supporting the frame from said sleeve, means for rocking said sleeve on the axle to raise and lower the frame, a gear rotatably mounted on said sleeve, said gear being provided with external and internal gear teeth, a pinion secured to the reel and in mesh with the external teeth of the gear, a second gear loose on the axle and in constant mesh with the internal teeth of said first-mentioned gear, and means for locking said second-mentioned gear to the axle, said locking means comprising a clutch member slidingly but non-rotatably mounted on the axle and having means for engaging said second-named gear.

JOSEPH DAIN, Jr.,
*Administrator of Joseph Dain, deceased.*